United States Patent [19]
Travis

[11] Patent Number: 5,729,882
[45] Date of Patent: Mar. 24, 1998

[54] METHODS OF ASSEMBLING A CHAIN AND A RIVET FOR USE IN SUCH ASSEMBLY

[75] Inventor: Thomas N. R. Travis, Newbern, Tenn.

[73] Assignee: Sandvik AB, Sandviken, Sweden

[21] Appl. No.: 614,064

[22] Filed: Mar. 12, 1996

[51] Int. Cl.[6] .................................................. B23P 11/00
[52] U.S. Cl. ........................ 29/444; 29/524.1; 29/525.06; 411/502
[58] Field of Search .................... 411/501, 502, 411/506, 504; 30/381; 29/434, 437, 444, 524.1, 525.06; 59/7, 84

[56] References Cited

U.S. PATENT DOCUMENTS

| | | | |
|---|---|---|---|
| 565,049 | 8/1896 | Test | 29/444 |
| 625,491 | 5/1899 | Converse | 411/506 |
| 2,060,394 | 11/1936 | Hiering | 29/444 |
| 4,904,137 | 2/1990 | Matuschek | 411/501 |
| 5,600,876 | 2/1997 | Notta et al. | 29/434 |

FOREIGN PATENT DOCUMENTS 43 09 464  9/1994  Germany.

*Primary Examiner*—David P. Bryant
*Attorney, Agent, or Firm*—Burns, Doane, Swecker & Mathis, L.L.P.

[57] ABSTRACT

A saw chain of a chain saw has its side links and center links interconnected by rivets. Prior to being staked, each rivet is in blank form and includes a cylindrical flange and a pair of barrels extending from opposite sides of the flange along a center axis thereof. Each barrel includes an axially inner cylindrical section and a tapered axially outer section. When the rivet is staked, the center section of each barrel fills a cylindrical portion of a hole formed in a respective side link, and the tapered section fills a chamfered portion of the hole to form a rivet head. The staked rivet bears against a wall of the cylindrical portion of the hole with a greater force than that with which the rivet bears against a wall of the tapered portion of the hole.

11 Claims, 1 Drawing Sheet

METHODS OF ASSEMBLING A CHAIN AND A RIVET FOR USE IN SUCH ASSEMBLY

BACKGROUND OF THE INVENTION

The present invention relates to saw chains such as saw chains for use in hand-held chain saws, and tractor-mounted harvester chain mechanisms and, in particular to rivets for interconnecting the side and center links of the saw chain, as well as to a method of assembling the side and center links by means of the rivets.

A conventional saw chain for a chain saw is depicted in FIG. 1. That saw chain generally comprises of center links 21 and side links 20, where the center links are drive links, and some of the side links 20A are cutter links. The chain is assembled by rivets 2 rigidly joined to the side links 20, and with the center links being freely rotatable upon the rivets.

FIG. 2 shows a conventional rivet blank 2 prior to being staked. The rivet blank 2 comprises a cylindrical flange or center section 3, and a pair of identical barrels or shanks 4 extending from opposite sides of the flange along a center axis A of the flange. The barrels 4 are of slightly tapering configuration, i.e. the outer surface of each barrel forms an angle α of about 2° with a line extending parallel to the center axis A. Such tapering facilitates the insertion thereof into respective holes of the side links 20. A concave recess 5 is formed in the outer end of each barrel to facilitate a centering of the riveting tool (not shown) on the rivet blank. The axially facing surfaces of the cylindrical flange are slightly undercut as shown at 8 in FIG. 2. The undercut can be up to about one degree.

Prior to a riveting operation, the rivet blank 2 is positioned such that its flange 3 is freely disposed in a hole 26 of the center link, and its barrels 4, 4 extend through holes of respective side links 20, 20. Each of the holes in the side links includes a cylindrical portion 22 and a chamfered portion 23. The chamfered portions are formed in outer surfaces 20A of the side links facing away from the center link 21. After the staking of the rivet, the barrels thereof have become deformed as shown in FIG. 3 to fixedly secure the barrels to respective side links, whereas the center link 21 is free to rotate relative to the rivet about the flange 3. The flange 3 should not be deformed.

Ideally, each barrel should completely fill its respective hole and form in each chamfered portion 23 of the hole a rivet head 6 having a convexly curved outer surface 7. When the saw chain is operating, the chain tension is transmitted from the side links to the center links through the deformed rivet barrels. Many quality aspects of the chain depend on how the contact pressure between each barrel and its hole in the side link is distributed. Preferably, the contact pressure should be high in the cylindrical portion of the hole to carry most of the tension with little risk of bending the link, and to keep the rivet from rotating. The contact pressure on the chamfered portion 23 should be low, since otherwise a sudden increase of the tension may stretch the barrel through a wedge action, resulting in a loosening of the rivet.

It may occur that the cylindrical portion 22 of the hole in the side wall is not completely filled by the rivet, whereupon the contact pressure therein is not as great as desired.

One way to achieve the desired contact pressure distribution is described in the patent DE 43 09464, where a rivet blank of standard type is deformed to create a rivet with concave heads, thereby emphasizing the radial expansion of the rivet. A serious drawback of this is, however, that the part of the rivet head extending into the chamfered portion becomes thinner than with a standard convex top. Such a chain is more easily damaged by sideways bending.

The present invention concerns a new rivet blank shape, which gives the saw chain the desired contact pressure distribution for optimal lengthwise stiffness, as well as the optimal rivet head shape for bending strength.

SUMMARY OF THE INVENTION

The present invention relates to a rivet blank for interconnecting two side links and a center link of a saw chain, as well as to a method of forming a saw chain utilizing such a rivet blank.

The rivet blank comprises a center flange of generally cylindrical shape defining a center axis, and a pair of barrels to be staked within holes of respective side links of a saw chain. The barrels extend outwardly from opposite sides of the flange along the center axis thereof. Each barrel includes an axially outer tapered section and an axially inner cylindrical section.

Preferably, each cylindrical section of the barrel occupies about one-half of the axial length of its respective barrel, and more preferably is longer than one-half of that length.

An outer surface of the tapered section of the barrel preferably forms an angle in the range of about 5–20 degrees with a line extending parallel to the center axis. That angle is preferably substantially 10°.

The method of forming a saw chain utilizing such a rivet involves the step of positioning the rivet blank such that the generally cylindrical portion is situated in a hole of the center link, and each barrel is situated in a hole of a respective side link, with the cylindrical section of the barrel disposed in a cylindrical portion of the hole, and the tapering section of the barrel disposed in the chamfered portion of the hole. When the barrels are staked, the tapering and cylindrical sections of each barrel fill the respective chamfered and cylindrical portions of the hole in the side link. Preferably, the staked barrels press against walls of the cylindrical portions with a first force, and press against walls of the chamfered portions with a second force stronger than the first force.

BRIEF DESCRIPTION OF THE DRAWING

The objects and advantages of the invention will become apparent from the following detailed description of a preferred embodiment thereof in connection with the accompanying drawing in which like numerals designate like elements and in which.

DETAILED DESCRIPTION OF A PREFERRED EMBODIMENT OF THE INVENTION

Figure 4:
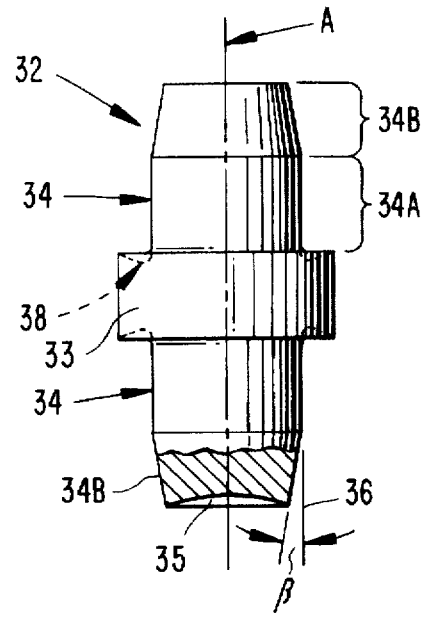
FIG. 4 is a side elevational view, partially broken away, of a rivet blank according to the present invention.
Figure 3:
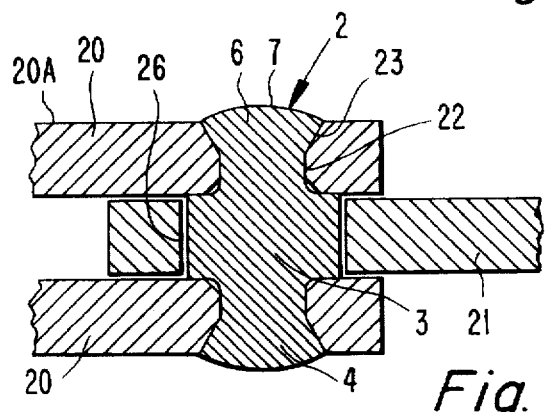
FIG. 3 is a longitudinal sectional view through a staked prior art rivet interconnecting side and center links of the saw chain.

A rivet blank 32 according to the present invention is depicted in FIG. 4. That rivet blank is similar to the prior art blank 2 shown in FIG. 2 in that it includes a cylindrical center flange 33, and a pair of barrels 34 extending from opposite sides of the flange, each barrel 34 having at its free end, a concave recess 35. The rivet is formed of alloy steel.

The axially facing surfaces of the cylindrical flange 33 are slightly undercut, as shown at 38 in FIG. 4. The undercut can be up to about one degree.

Figure 1:
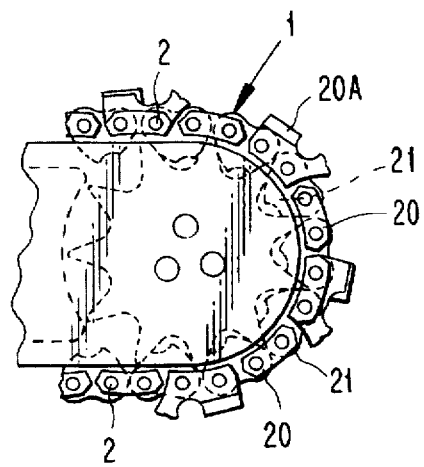
FIG. 1 is a fragmentary side elevational view of a conventional saw chain for a chain saw.
Figure 2:
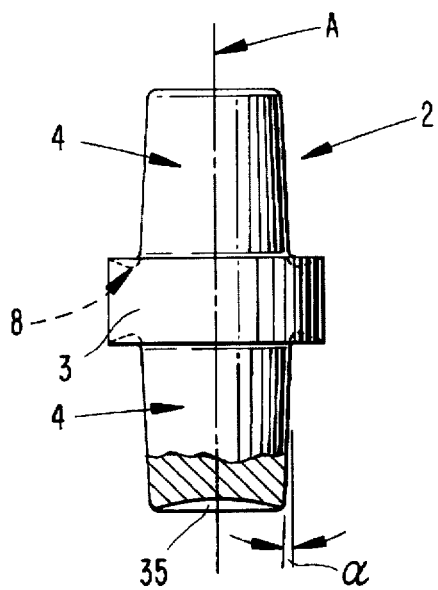
FIG. 2 is a side elevational view, partly broken away, of a prior art rivet used in the manufacture of the saw chain depicted in FIG. 1.

Each barrel 34, instead of being tapered along its entire length as in FIG. 2, has an inner section 34A of cylindrical shape, and an outer section 34B of tapered shape. Each cylindrical section 34A extends for an axial distance slightly greater than one half of the length of its respective barrel.

The outer surface 37 of the tapered section forms an angle $\beta$ with a line 36 extending parallel to the center axis A. The angle $\beta$ is preferably from about 5 degrees to about 20 degrees, and more preferably about 10 degrees.

It will be appreciated that, prior to the staking of the rivet, a gap will be present between the barrel and the wall of the hole in the side link, due to the necessary manufacturing tolerances. The radial dimension of such a gap in the case of the completely tapered prior art barrel of FIG. 2 will vary along the entire axial length of the barrel. However, such a gap in the case of the present invention will be of uniform radial dimension and also of less volume than in the case of the FIG. 2 rivet and blank. Consequently, after staking the rivet blank of the present invention, the section of the rivet which contacts the cylindrical portion 22 of the hole is more likely to completely fill that hole portion 22 and contact it with the requisite pressure for preventing rotation of the rivet than in the case of the FIG. 2 rivet. That is, the requisite pressure will be attained more consistently.

Also, the presence of cylindrical section 34B of the barrel facilitates the manufacture of the rivets for the following reason. It is necessary that the rivet blank have a relatively precise alignment of the longitudinal axes of the barrels (i.e., one barrel should not be radially offset relative to the other). This requires that rivets be gauged periodically during manufacture. The gauging step requires that one of the barrels be held in a fixture. Due to the tapered shape of the prior art barrel, it has been necessary to provide a tapered socket in the fixture, i.e. a socket having a taper of 2 degrees. However, that tapered socket will eventually wear, resulting in an imprecise fit between the barrel and socket which, in turn, leads to imprecise gauging.

However, the cylindrical section 34A of the rivet blank according to the present invention enables a cylindrical socket to be provided which effects an adequate lateral support for the rivet blank during gauging. This avoids the wear-related problem discussed above in connection with the prior art.

It will be appreciated from the foregoing discussion that the present invention enables a rivet blank to attain hole fill more consistently than prior art rivet blanks, which leads to a tighter contact between the rivet and side links for preventing relative rotation between the rivet and side links. Also, the gauging of rivet blanks during the manufacturing process is rendered less susceptible to inaccuracies by the present invention.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed:

1. A rivet blank for interconnecting two side links and a center link of a saw chain, the rivet blank comprising:

a center flange of generally cylindrical shape defining a center axis, and a pair of barrels for being staked within holes of respective side links of a saw chain, the barrels extending outwardly from opposite sides of the flange along the center axis thereof, each barrel including an axially outer tapered section and an axially inner cylindrical section.

2. The rivet blank according to claim 1, wherein each cylindrical section occupies about one half of the axial length of its respective barrel.

3. The rivet blank according to claim 2, wherein an axial inner end of the tapered section coincides with an axial outer end of its associated cylindrical section.

4. The rivet blank according to claim 1, wherein each cylindrical section occupies more than one half of the length of its respective barrel.

5. The rivet blank according to claim 4, wherein an outer surface of the tapered section forms an angle in the range of about 5–20 degrees with a line extending parallel to the center axis.

6. The rivet blank according to claim 5, wherein the angle is substantially 10 degrees.

7. The rivet blank according to claim 1, wherein an outer surface of the tapered section forms an angle in the range of about 5–20 degrees with a line extending parallel to the center axis.

8. The rivet blank according to claim 1, wherein the center flange has axially facing surfaces which are slightly undercut.

9. A method of forming a saw chain comprising the steps of:

A) providing a pair of side links and a center link disposed between the side links such that holes in the side links and center link are aligned with one another, each hole of the side links including a cylindrical portion and a chamfered portion, the chamfered portion disposed in an outer surface of a side link, the outer surface facing away from the center link;

B) providing a rivet blank comprising a generally cylindrical portion and a pair of barrels projecting outwardly from opposite sides of the generally cylindrical portion along a longitudinal axis of the generally cylindrical portion, each barrel including an axial inner cylindrical section and an axial outer tapering section;

C) positioning the rivet blank such that the generally cylindrical portion is situated in the hole of the center link, and each barrel is situated in a hole of a respective side link, with the cylindrical section there of disposed in the cylindrical portion of the hole, and the tapering section thereof disposed in the chamfered portion of the hole; and D) staking the barrels such that the tapering and cylindrical sections of each barrel fill the respective chamfered and cylindrical portions of the hole.

10. The method according to claim 9, wherein step D comprises causing the staked barrels to press against walls of the cylindrical portions with a first force, and to press against walls of the chamfered portions with a second force stronger than the first force.

11. The method according to claim 9, wherein step D comprises causing the tapered section of each barrel to form a rivet head in its respective chamfered portion, the rivet head having a convex outer surface.

\* \* \* \* \*